(No Model.)
J. J. LOGAN.
SPEED GOVERNOR.
No. 367,418. Patented Aug. 2, 1887.
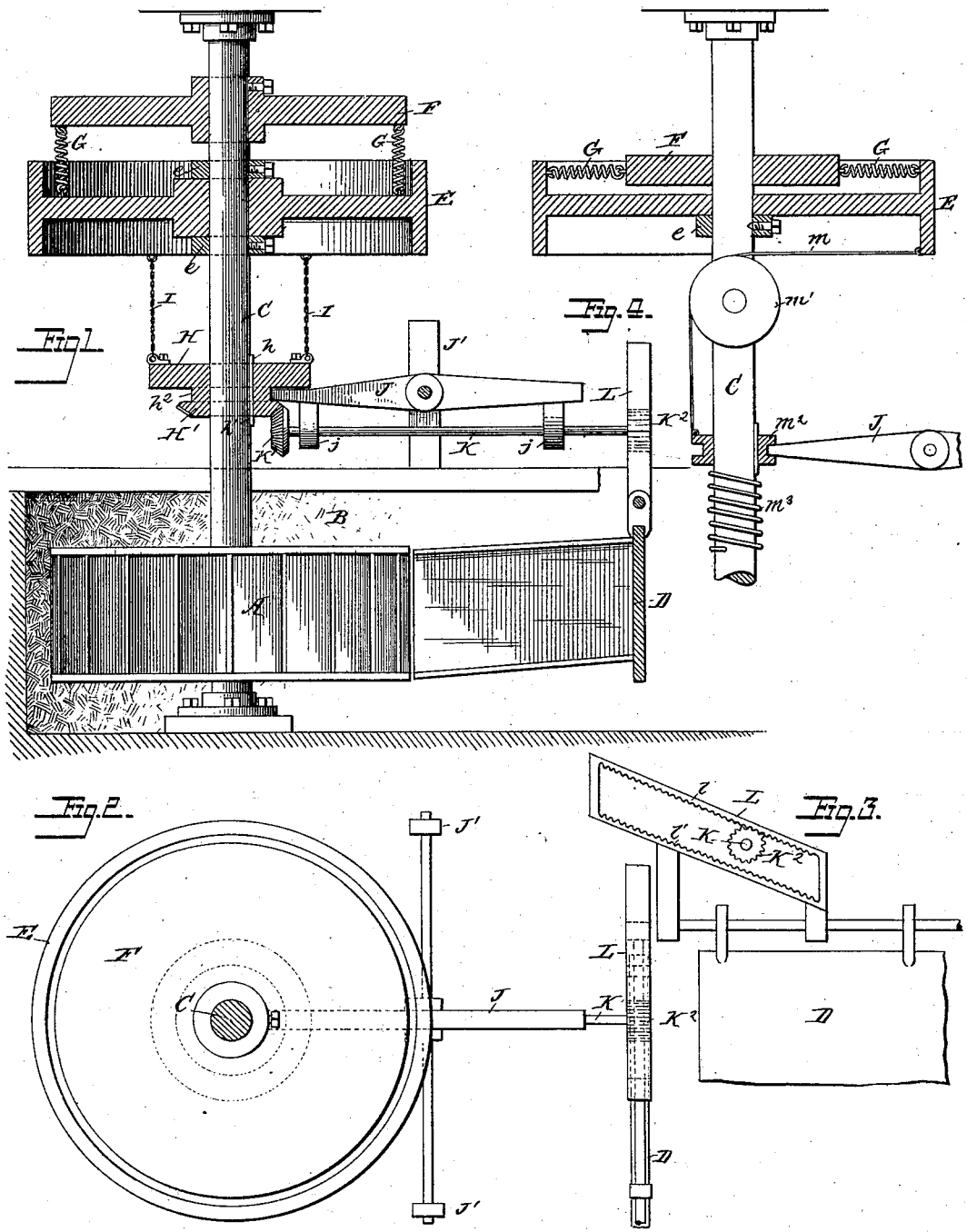
Attest:
Inventor:
John J. Logan
per Foster & Freeman
attys

UNITED STATES PATENT OFFICE.

JOHN JOHNSON LOGAN, OF HALIFAX, NOVA SCOTIA, CANADA.

SPEED-GOVERNOR.

SPECIFICATION forming part of Letters Patent No. 367,418, dated August 2, 1887.

Application filed July 22, 1886. Serial No. 208,764. (No model.)

*To all whom it may concern:*

Be it known that I, JOHN JOHNSON LOGAN, a subject of the Queen of Great Britain, residing at Halifax, Nova Scotia, Canada, have invented certain new and useful Improvements in Speed-Governors, of which the following is a specification.

My invention relates to improvements in speed-governors adapted for use in connection with the rotating main or driving shaft of a power-transferring system to maintain a predetermined rate of speed throughout said system irrespective of the load carried thereby; and to this end it consists in means, substantially such as is hereinafter described, which, when used in connection with a main or driving shaft, will cause said shaft to close therefrom or to open thereto the source from which it derives its motion and power.

Referring to the drawings, wherein similar letters of reference denote similar parts, Figure 1 represents a sectional view of a speed-governor embodying my invention in position upon a shaft driven by a water-wheel. Fig. 2 is a plan view of the parts set forth in Fig. 1. Fig. 3 represents an elevation of the water-gate and the attachments for operating said gate. Fig. 4 represents in part elevation, part section, a modified form of my invention.

I have in the accompanying drawings illustrated my invention in connection with the main or driving shaft of a power-transferring system operated by a water-wheel, and will herein so describe it, although it is obvious that it may be applied to shafts operated by other motors—as, for instance, steam or air engines—or to shafts which derive their motion and power through intermediate shafts from a motor, and control by their movements only a portion of the system of which they are a part. I therefore do not limit myself to any particular shaft of a system or to any particular adaptation of my device.

Proceeding, A designates a water-wheel, which is mounted within a pit, B, upon the lower end of a vertical shaft, C, which is supported in suitable bearings above said pit, and is provided with a driving wheel or pulley, E, which is loosely mounted thereon above a collar, *e*, rigidly secured thereto.

F designates a disk or wheel, preferably of smaller diameter than the pulley E, which is rigidly secured upon the shaft C above, and connected to said wheel E by spring-connections G, as shown.

If desired, non-resilient connections, as rope or chains, may be employed to connect the pulley E and disk F together, in lieu of the resilient connections shown.

H designates a sliding collar, which is placed upon the shaft C below the pulley E, and held from rotation on said shaft by a key, $h$, that engages a key-seat, $h'$, formed in said collar.

I designates straps or bands which connect the pulley E and collar H together, for a purpose presently to be explained. I provide the collar H with an annular groove, $h^2$, to receive one end of a lever, J, which is pivoted to a support, J', and provided with depending apertured lugs $j$, that support a rotatable shaft, K, upon one end of which is mounted a bevel-pinion, K', that engages a bevel gear-wheel, H', secured to the collar H. The opposite end of the shaft K is provided with a gear-pinion, $K^2$, that engages alternately teeth $l\ l'$, formed upon the opposite sides, respectively, of a rack-frame, L, attached to the gate D, which controls the passage of water to the pit B.

By reference to the drawings it will be observed that the rack-frame L is secured in an inclined position to the gate D, for a reason presently to be made clear.

The lever J, its supported shaft K, and the frame L, I term the "shifting devices," as said parts may be connected to belt-shippers, valves, &c., to operate the same.

The operation of my improvement is as follows: It being understood that the springs G are of such strength and tension as to resist extension under the strains or power necessary to operate a machine running at normal speed, should, however, a greater load be placed upon said machines—or, in other words, should a greater amount of work be required of said machines and a consequent greater power be required to operate them—the springs will be extended to certain limits, and all shocks to the mechanism incident to the sudden addition of such load will be avoided. At the same time the addition of such load will cause the wheel E to drag or fall behind the shaft C in its speed, by which said wheel will, through its spring-connection with the wheel F and the bands or straps I, raise the collar H and bring the pinion K² into engagement with the teeth l of the rack L, thus opening the gate D and increasing the volume of water admitted to the water-wheel to impart an increased power thereto. When the power of the shaft C is in excess of the power required to operate the machines, the drag of the wheel E will be to a great extent removed from said shaft, and such wheel will be returned to its normal position. Should all load be removed from the machines, the drag of said wheel will be nearly or quite removed from the shaft and wheel F, and will, through the collar H and lever J, throw the gear K² into engagement with the teeth l' of the rack L, and thereby move said rack to close the gate to a greater or less extent. In Fig. 4 I have shown a modified form of my invention, wherein a cord, m, extends from the wheel E over a pulley, m', pivoted upon the side of the shaft C, and thence to a collar, m², to which is secured one end of a spring, m³, placed upon the shaft C below the collar m², and secured at its opposite end to said shaft. Any drag of the wheel E will operate to raise the collar m² through the cord m against the tension of the spring m³, which, when said drag is removed, operates to return the collar to its normal position.

If desired, a hub having arms projecting therefrom may be used in lieu of the wheel F, in which case the springs G are connected to said arms.

Without limiting myself to the exact construction of parts shown herein, I claim—

1. A vertical shaft having a support rigidly secured thereto, in combination with a driving-wheel loosely mounted upon said shaft, and pendent flexible connections between said loose wheel and support, and shifting devices connected with the driving-wheel, substantially as described.

2. A vertical shaft having a support, F, rigidly secured thereto, a driving-pulley loosely mounted thereon, and a grooved sliding collar, H, in combination with resilient connections between said driving-wheel and support F, and flexible connections between said driving-wheel and the collar H, substantially as described.

3. A shaft, a sliding collar, H, placed and held from rotation on said shaft by a key, h, said collar having an annular groove, $h^2$, and bevel-gear segment H', in combination with a lever, J, a wheel, E, and connections between said wheel and collar, substantially as described.

4. A shaft, a sliding collar thereon and provided with a gear-wheel, and a lever operated by said collar, in combination with a rotatable shaft having bearings secured to said lever, gear-wheels mounted upon said shaft, the gate or valve controlling the power, and the main or driving-wheel, substantially as described.

5. A gate or valve, as D, having a rack-frame, L, secured thereto, in combination with a shaft having gear-pinions secured thereto, and a gear-wheel secured to or integral with a sliding collar, H, and shaft C, substantially as described.

6. A gate or valve, D, a gear-rack frame secured thereto, in combination with a shaft, K, having gear-wheels K' K², a lever, J, to support said shaft, sliding collar H, having groove $h^2$, and gear-wheel H', pulley E, and connections between said pulley E and collar H, substantially as described.

7. A shaft, a disk or wheel, F, rigidly secured to said shaft, a sliding grooved collar placed upon said shaft, and a driving-wheel loosely mounted upon said shaft between and connected to said fixed disk or wheel F and collar H, respectively, in combination with a lever, J, a shaft, K, pinion K' K², rack-frame L, and gate D, substantially as described.

In testimony whereof I have signed my name to this specification in the presence of two subscribing witnesses.

JOHN JOHNSON LOGAN.

Witnesses:
W. K. THOMSON,
JAMES THOMSON.